United States Patent [19]

Cherubim et al.

[11] 3,949,149

[45] Apr. 6, 1976

[54] PROCESS FOR THE PRODUCTION OF WOOD MATERIALS HAVING HIGH RESISTANCE TO HOT WATER, SAID MATERIALS CONTAINING PHENOL-ALDEHYDE RESIN AND ALKYLENE CARBONATE HARDENER

[75] Inventors: Martin Cherubim, Rheinkamp-Eick; Karl-Heinz Heinemann, Neukirchen-Vluyn, both of Germany

[73] Assignee: Deutsche Texaco Aktiengesellschaft, Hamburg, Germany

[22] Filed: Dec. 19, 1974

[21] Appl. No.: 534,656

[30] Foreign Application Priority Data

Dec. 21, 1973 Germany............................ 2363782

[52] U.S. Cl. ................ 428/529; 260/17.2; 428/537

[51] Int. Cl.$^2$. B32B 21/08; B32B 27/42; C08L 1/02
[58] Field of Search ............ 260/17.2; 428/537, 529

[56] References Cited
UNITED STATES PATENTS 3,342,776    9/1967    Lambuth............................ 260/17.2

*Primary Examiner*—Harold D. Anderson
*Assistant Examiner*—Edward Woodberry
*Attorney, Agent, or Firm*—T. H. Whaley; C. G. Ries; Carl G. Seutter

[57] ABSTRACT

Wood materials are prepared, characterised by improved resistance to hot water and by high weather resistance, by combining wood products with a phenol-aldehyde resin and alkylene carbonate hardener, the latter being incorporated in said resin as an aqueous formaldehyde solution.

5 Claims, No Drawings

PROCESS FOR THE PRODUCTION OF WOOD MATERIALS HAVING HIGH RESISTANCE TO HOT WATER, SAID MATERIALS CONTAINING PHENOL-ALDEHYDE RESIN AND ALKYLENE CARBONATE HARDENER

FIELD OF THE INVENTION

This invention relates to a process for producing wood materials characterized by improved resistance to hot water and by high weather resistance.

BACKGROUND OF THE INVENTION

It has been found that phenolic resin, such as phenol-formaldehyde resins may be cured more quickly by the use of alkylene carbonates such as ethylene carbonate.

The use of alkylene carbonates as hardeners for phenolic resins permits attainment of a shorter gelling time and thus a quicker curing as well as an improved resistance to hot water of the wood materials produced therewith. This latter important property which is a parameter of weather resistance, determined by measuring tensile strength V 100, perpendicular to plate. *(See German Industrial Standards (DIN) No. 68 761, sheet 3). *

Tensile strength V 100 means pretreatment of the test specimen by storing the same for 2 hrs. in boiling water whereas Tensile strength means non-pretreatment of said test specimen.

Unfortunately, the use of alkylene carbonates as hardeners raises certain difficulties when used with phenol aldehyde resin solutions. Although the alkylene carbonates may be readily processed after addition to the phenol aldehyde resin solutions, incorporation of alkylene carbonates into the phenolic resin binder solution raises certain difficulties. For instance, if one adds solid alkylene carbonate to the phenolic resin binder solution, this would raise difficulties since the curing takes place almost immediately during the step of dissolving, thus undesirably forming small solid particles. But, even when the alkylene carbonates is added as a liquid, colloidal particles are formed, if one does not provide for an instantaneous and complete mixing; and this is attained only with great technical difficulties if at all. The solid and colloidal particles so formed are responsible for considerable breakdowns during manufacture of wood materials, due to the blockage of the nozzles in the spraying system by means of which the liquids are added to the solid components of the wood material.

The precipitation of the colloidal particles may only be avoided by adding the alkylene carbonate in very dilute solution to the binder solution. But if the diluting agent is water, this would mean adding an unfavourably large amount of water to the wood material during spraying with the binder solution. This is disadvantageous because inter alia the water can dissolve only 20 per cent by weight of e.g. propylene carbonate; and the large amounts of water require respectively more evaporation heat and longer moulding time.

It is an object of this invention to overcome these difficulties arising by using alkylene carbonates as the hardeners for phenol aldehyde resin binder solutions. Other objects will be apparent to those skilled in the art from inspection of the follosing description.

STATEMENT OF THE INVENTION

In accordance with certain of its aspects, the novel process of this invention for production of wood materials having an improved resistance to hot water and a high weather resistance may comprise adding (i) a solution containing 30 – 80 wt % of alkylene carbonate in 30 % – 42 % aqueous formaldehyde to (ii) an alkaline condensed phenol-aldehyde resin having an aldehyde: phenol mole ratio of at least about 1.6:1, a viscosity at a solids content of 48 wt % of above 200 cps measured at 20 % in the Hoppler viscosimeter, an alkali hydroxide content of 0.05–2 moles per mole of phenol, and a free phenol content of less than 6 wt %, said mixture containing 0.01 – 1 mole of alkylene carbonate per mole of phenol; adding said mixture to wood flour, wood chips, wood veneer, or wood paper; and curing to form a wood material characterized by high resistance to hot water.

DESCRIPTION OF THE INVENTION

The wood material which may be prepared by practice of the process of this invention may be based upon wood products such as sawdust, wood flour, wood paper, wood veneers or wood chips. It may be formed from a mixture of certain of these materials such as wood chips and wood flour. Particulate wood products such as sawdust, wood flour, or wood chips may find particular use in practice of the process of this invention.

The bonding composition which may be employed may be an alkaline condensed phenol - aldehyde (preferably formaldehyde) resin which has a mole ratio of aldehyde to phenol of at least about 1.6:1. Preferably the viscosity of this resin is above 200 centipoises cps when measured at a solids content of 48 wt %. (The viscosity is measured at 20°C on a Hoppler viscosimeter.)

The phenol-aldehyde resin system typically is characterized by an alkali hydroxide content of 0.05–2 moles per mole of phenol. The alkali hydroxide is commonly sodium hydroxide. The resin is also commonly characterized by a free phenol content of less than about 6 wt %.

The bonding composition is preferably employed in amount to provide 6 % – 12 %, preferably 9 % – 10 % by weight of resin based upon the amount (dry basis) of e.g. wood chips.

The hardener composition may be prepared in an aqueous solution of formaldehyde containing 30 % – 42 %, say 35 % – 38 % formaldehyde. In lieu of formaldehyde also acetaldehyde or propionaldehyde, etc., may be used, with formaldehyde, however, being preferred as it is much cheaper than the other aldehydes. To this solution is added 30 % – 80 % by weight of alkylene carbonate, typically ethylene carbonate, propylene carbonate, or butylene carbonate. A preferred hardener composition may contain 37 % aqueous formaldehyde solution to which has been added 50% by weight of propylene carbonate.

The hardener composition is preferably added to the resin solution in amount of 0.01–1 mole of alkylene carbonate per mole of total phenol, i.e. phenol in the phenol-aldehyde resin. plus free phenol.

The hardener composition is sprayed onto the wood (typically in the form of particulate products such as chips having 3 wt % moisture content) in amount sufficient to give a glue factor (weight of resin, dry basis, per weight of wood, dry basis) of typically 6–12, say 9–10, preferably about 9. The chips, bearing the bonding agent (including the resin and hardener composition) are pressed into a plate having a thickness of typically 8 mm and a density of 0.70 g/cc. Molding is effected typically at 165°C and 20 kilopounds per square centimeter over 2.4 minutes.

The molding process is particularly characterized by its ability to be operated with a high degree of reliability. The use of the novel solution of alkylene carbonate in aqueous formaldehyde permits operation with formation of substantially no solid or colloidal particles in the liquid. Accordingly the spraying of the e.g. wood chips with liquid is continuous and free of blockage.

It is found that no solid or colloidal particles are formed when the alkylene carbonates are added in the form of solutions consisting of from 30 – 80 percent by weight of alkylene carbonate in a 30 – 42 percent aqueous formaldehyde solution to the phenolic resin binder solutions. Preferred are solutions consisting of 45 – 55 percent by weight of alkylene carbonate in a 35 – 38 percent aqueous formaldehyde solution.

It is surprising that an aqueous formaldehyde solution may dissolve such a large amount alkylene carbonates without formation of solid or colloidal particles while adding the hardener solution to the phenolic resin binder solutions. The addition of alkylene carbonate formaldehyde solution is responsible for an additional increase in the reactivity of the phenolic resin binder solutions.

The sheet or board so obtained is characterised by good flexural strength (as determined by German Industrial Standards (DIN) No. 68 761), good tensile strength (as determined by DIN Standards Test 52 365), and improved tensile strength V 100 (as determined by DIN Standards Test 52 365 after pretreating the test specimen for two hours in boiling water). As mentioned before, this test is indicative of the increased weather resistance of the novel product.

The novel product so achieved which is characterised by increased weather resistance may thus comprise a body of wood products bonded together by the addition thereto, prior to curing of i. a solution containing 30 to 80 wt.% of alkylene carbonate in 30% – 42% aqueous formaldehyde and (ii) an alkaline condensed phenol - aldehyde resin having an aldehyde: phenol mole ratio of at least about 1.6 : 1, a viscosity at a solids content of 48 wt.% of above 200 cps measured at 20% in the Hoppler viscosimeter, an alkali hydroxide content of 0.05 – 2 moles per mole of phenol, and a free phenol content of less than 6 wt.%, said mixture containing 0.01–1 mole of alkylene carbonate per mole of phenol.

DESCRIPTION OF PREFERRED EMBODIMENT

Practice of this invention may be apparent to those skilled in the art from the following examples.

EXAMPLE I 94 grams of phenol (1 mole), 255 ml of a 30% aqueous formaldehyde solution (2.55 moles of formaldehyde), and 29 ml of a 33 percent aqueous sodium hydroxide solution (0.325 moles of sodium hydroxide) are mixed together under stirring in a vessel and heating within 40 minutes to a temperature of 90°C. Then further 29 ml of the 33 percent aqueous sodium hydroxide solution are added. The mixture is then held at a temperature of 90°C for 60 minutes, followed by distilling 70 ml of water, and condensing until the residue has a viscosity of 60 seconds measured at 20°C in a 4 mm DIN Standards flow cup.

The binder so obtained has the following properties:

TABLE 1

| | |
|---|---|
| Solids content | 48 wt.% |
| Viscosity, measured at 20°C in a 4 mm DIN Standards flow cup | 60 seconds |
| Gelling time, measured at 100°C | 28 minutes |
| Hardening time, determined at 130°C on the test board* | 45 seconds |

*Description of the test: About 1 gram of resin is put into the mould of a test board at a temperature of from 130 to ± 2°C and stirred with a pointed glass bar until a resite (C-stage resin) has formed. The occurrance of the resite formation may be recognised by the viscosity of the resin highly increasing and by the resin being no longer ropy. The time from putting the resin onto the board to said resite formation is measures, thus being the hardening time.

4 percent by weight of hardener solution consisting of equal parts by weight of propene carbonate and a 37 percent aqueous formaldehyde solution is added to the binder so obtained. The resin hardener solution so produced does not contain any solid or colloidal particles; and its gelling time is reduced to as little as 8 minutes in contrast to the 28 minutes of gelling time of pure phenolic resin binder solutions.

The resin hardener is sprayed onto wood chips (having a 3% moisture content) in amount of 9 wt.% resin dry basis based upon wood used dry basis. The mixture is moulded at 165°C and 20 Kp/sq.cm for 2.4 minutes to form a plate 8 mm thick. This product was tested for tensile strength and flexural strength.

Production conditions and results are illustrated in Table 2.

TABLE 2

| | |
|---|---|
| Moisture content of the chips | 3% |
| Glue factor (wt.% resin(dry basis) based on the amount of wood used (dry basis) | 9 |
| Thickness of plate | 8 mm |
| Density of plate (specific gravity) | 0.70 gram/cm³ |
| Moulding temperature | 165° |
| Moulding pressure | 20 Kp/sq.cm |
| Moulding time | 2.4 minutes |
| Moulding time in minutes per mm thickness of plate | 0.3 |
| Flexural strength according to DIN Standards No. 52 365 | 340 Kp/sq.cm |
| Tensile strength V 20* | 8.8 kp/sq.cm |
| Tensile strength V 100* perpendicular to plate, according to DIN Standards No. 52 365 | 3.8 kp/sq.cm |

*V 20: The test specimen was not pretreated.
V100: The test specimen was pretreated by being stored for two hours in boiling water.

From this example, it may be seen that the novel process of this invention is characterised by ease of operation in that the resin hardener solution is free of undesirable solid or colloidal particles. It may also be noted that the product formed from wood chips is characterised by a desirably high resistance to hot water and also by a good weather resistance.

EXAMPLE II

Results comparable to those achieved in EXAMPLE I maybe obtained by using ethylene carbonate in place of propylene (propene) carbonate.

EXAMPLE III

Results comparable to those obtained in Example I may be obtained by using sawdust in place of wood chips.

EXAMPLE IV

Results comparable to those obtained in Example I may be obtained by using sheets of wood veneer in place of wood chips.

EXAMPLE V

Results comparable to those of Example I may be attained by using ethylene carbonate in 20% formaldehyde in place of propylene carbonate in 37% formaldehyde.

Although this invention has been illustrated by reference to specific embodiments, it will be apparent to those skilled-in-the-art that various changes and modifications may be made which clearly fall within the scope of this invention.

EXAMPLE VI

Example I was repeated but the hardener solution consisting of propylene carbonate in aqueous formaldehyde solution was replaced by the same amount of a 50 % aqueous ethylene carbonate solution. The results obtained were about the same as of Example I; however, the tensile strength, perpendicular to plate V 100 test is worse, i.e. about 2.7 kp/sq.cm. This Example shows the importance of using an aqueous formaldehyde solution as the solvent for the alkylene hardener in view of the resistance to hot water and the resistance to weather of the products.

We claim:

1. A process for the production of wood materials having high resistance to hot water which comprises
    adding (i) a solution containing 30 – 80 wt % of alkylene carbonate in 30%–40% aqueous formaldehyde to (ii) an alkaline condensed phenol-aldehyde resin having an aldehyde: phenol mole ratio of at least about 1.6:1, a viscosity at a solids content of 48 wt % of above 200 cps measured at 20°C in the Hoppler viscosimeter, an alkali hydroxide content of 0.05 – 2 moles per mole of phenol, and a free phenol content of less than 6 wt %, said mixture containing 0.01–1 mole of alkylene carbonate per mole of total phenol; adding said mixture to wood flour, wood chips, wood veneer, or wood paper; and curing to form a wood material characterized by high resistance to hot water.

2. A process as claimed in claim 1 wherein said alkylene carbonate is ethylene carbonate.

3. A process as claimed in claim 1 wherein said alkylene carbonate is propylene carbonate.

4. A process as claimed in claim 1 wherein said aqueous formaldehyde solution is 37% aqueous formaldehyde.

5. A wood material characterized by improved resistance to hot water and increased weather resistance which comprises
    a body of wood products bonded together by the addition thereto, prior to curing, of
    (i) a solution containing 30–80 wt % of alkylene carbonate in 30% – 42% aqueous formaldehyde admixed with (ii) an alkaline condensed phenol - aldehyde resin having an aldehyde: phenol mole ratio of at least about 1.6:1, a viscosity at a solids content of 48 wt % of above 200 cps measured at 204 in the Hoppler viscosimeter, an alkali hydroxide content of 0.05 – 2 moles per mole of phenol, and a free phenol content of less than 6 wt %, said mixture containing 0.01 – 1 mole of alkylene carbonate per mole of total phenol.

* * * * *